(12) United States Patent
Cullari et al.

(10) Patent No.: US 12,321,485 B2
(45) Date of Patent: Jun. 3, 2025

(54) METHODS AND SYSTEMS DIRECTED TO DISTRIBUTED PERSONAL DATA MANAGEMENT

(71) Applicant: Konvergence, Inc., Dripping Springs, TX (US)

(72) Inventors: Dante C. Cullari, Dripping Springs, TX (US); Zoltan A. Papp, Austin, TX (US); Viktor Kostadinov, East Lansing, MI (US)

(73) Assignee: Konvergence, Inc., Dripping Springs, TX (US)

( * ) Notice: Subject to any disclaimer, the term of this patent is extended or adjusted under 35 U.S.C. 154(b) by 290 days.

(21) Appl. No.: 17/731,898

(22) Filed: Apr. 28, 2022

(65) Prior Publication Data
US 2023/0351040 A1   Nov. 2, 2023

(51) Int. Cl.
*G06F 21/62* (2013.01)
*G06F 16/27* (2019.01)
*G06F 21/57* (2013.01)

(52) U.S. Cl.
CPC ......... *G06F 21/6245* (2013.01); *G06F 16/27* (2019.01); *G06F 21/57* (2013.01)

(58) Field of Classification Search
CPC ....... G06F 21/6245; G06F 21/57; G06F 16/27
See application file for complete search history.

(56) References Cited

U.S. PATENT DOCUMENTS

| | | | | |
|---|---|---|---|---|
| 7,499,958 | B1 * | 3/2009 | Ionescu | G06F 16/2228 |
| 9,077,525 | B2 * | 7/2015 | Chandran | H04L 9/088 |
| 11,481,603 | B1 * | 10/2022 | Newman | G06Q 40/03 |
| 2010/0199098 | A1 * | 8/2010 | King | H04L 9/3213 |
| | | | | 713/182 |
| 2013/0007029 | A1 * | 1/2013 | Ziemann | G06F 16/00 |
| | | | | 707/758 |
| 2013/0007049 | A1 * | 1/2013 | Ziemann | G06T 11/20 |
| | | | | 707/769 |
| 2013/0007126 | A1 * | 1/2013 | Ziemann | G06Q 50/01 |
| | | | | 709/204 |
| 2013/0208893 | A1 * | 8/2013 | Shablygin | H04L 9/0894 |
| | | | | 380/277 |
| 2013/0219463 | A1 * | 8/2013 | Sambamurthy | G06F 21/31 |
| | | | | 726/1 |
| 2013/0275229 | A1 * | 10/2013 | Moganti | G06F 16/20 |
| | | | | 705/14.66 |
| 2014/0298417 | A1 * | 10/2014 | Kawashima | G06Q 10/107 |
| | | | | 726/28 |
| 2015/0356316 | A1 * | 12/2015 | Thompson | G06F 21/00 |
| | | | | 726/28 |
| 2017/0068716 | A1 * | 3/2017 | Richards | G06Q 10/10 |
| 2017/0149906 | A1 * | 5/2017 | DeMaris | G06Q 10/101 |
| 2019/0253431 | A1 * | 8/2019 | Atanda | G06F 21/62 |
| 2020/0004835 | A1 * | 1/2020 | Ramanath | G06F 16/24578 |

\* cited by examiner

*Primary Examiner* — Oleg Survillo
(74) *Attorney, Agent, or Firm* — Terrile, Cannatti & Chambers, LLP; Emmanuel A. Rivera (57) ABSTRACT

Described herein are a system, method, and computer-readable medium for personal data management. A user device hosts or accesses multiple platforms and data stores that gather and host personal data of a user from various sources. The user device clusters the multiple platforms and data store. Each of the multiple platforms and data stores are accessible to one another. Personal data is shared with other user devices if determined. Access is provided for personal data to be shared if determined to be shared with other user devices.

17 Claims, 11 Drawing Sheets

METHODS AND SYSTEMS DIRECTED TO DISTRIBUTED PERSONAL DATA MANAGEMENT

BACKGROUND OF THE INVENTION

Field of the Invention

The present invention relates to the implementation of information handling systems directed to providing personal and enterprise data management. More specifically, embodiments of the invention provide user hosting personal data over multiple platforms and data stores which are clustered and may be shared with users.

Description of the Related Art

As the value and use of information continues to increase, individuals and businesses seek additional ways to process and store information. One option available to users is information handling systems. Information handling systems include personal computers (PC) server computers, such as those in data centers with 24-hour runtime, and other computing devices. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems manage user data, including personal and enterprise data. Such personal data includes information that users would like to be shared with other entities; however, there are concerns that personal data can be exposed to malicious parties. Therefore, there is a desire to be able to protect personal data from being accessed and stolen by malicious parties. There should be assurance that personal data is not lost and readily available to the user. Users should be able to easily access and use their personal data.

SUMMARY OF THE INVENTION

A system, method, and computer-readable medium are disclosed personal data management comprising hosting information and data as personal data that resides on multiple platforms and data stores; clustering the multiple platforms and data stores, wherein each of the multiple platforms and data stores are accessible to one another; determining if the personal data is to be shared with other users from the clustered multiple platforms and data stores; and allowing access to the personal data if determined to be shared with other users.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Described herein are a system and method of a user device that hosts personal information and data of a particular entity or user. The information and data are gathered from various locations, such as locations on the world wide web, by multiple platforms and placed in data stores associated with the multiple platforms. The user device hosts or directly accesses the multiple platforms and data stores and allows communications between the multiple platforms and data stores, which are clustered together by the user device. Implementations provide for information and data of clustered user related platforms and data stores to be shared.

Figure 1:
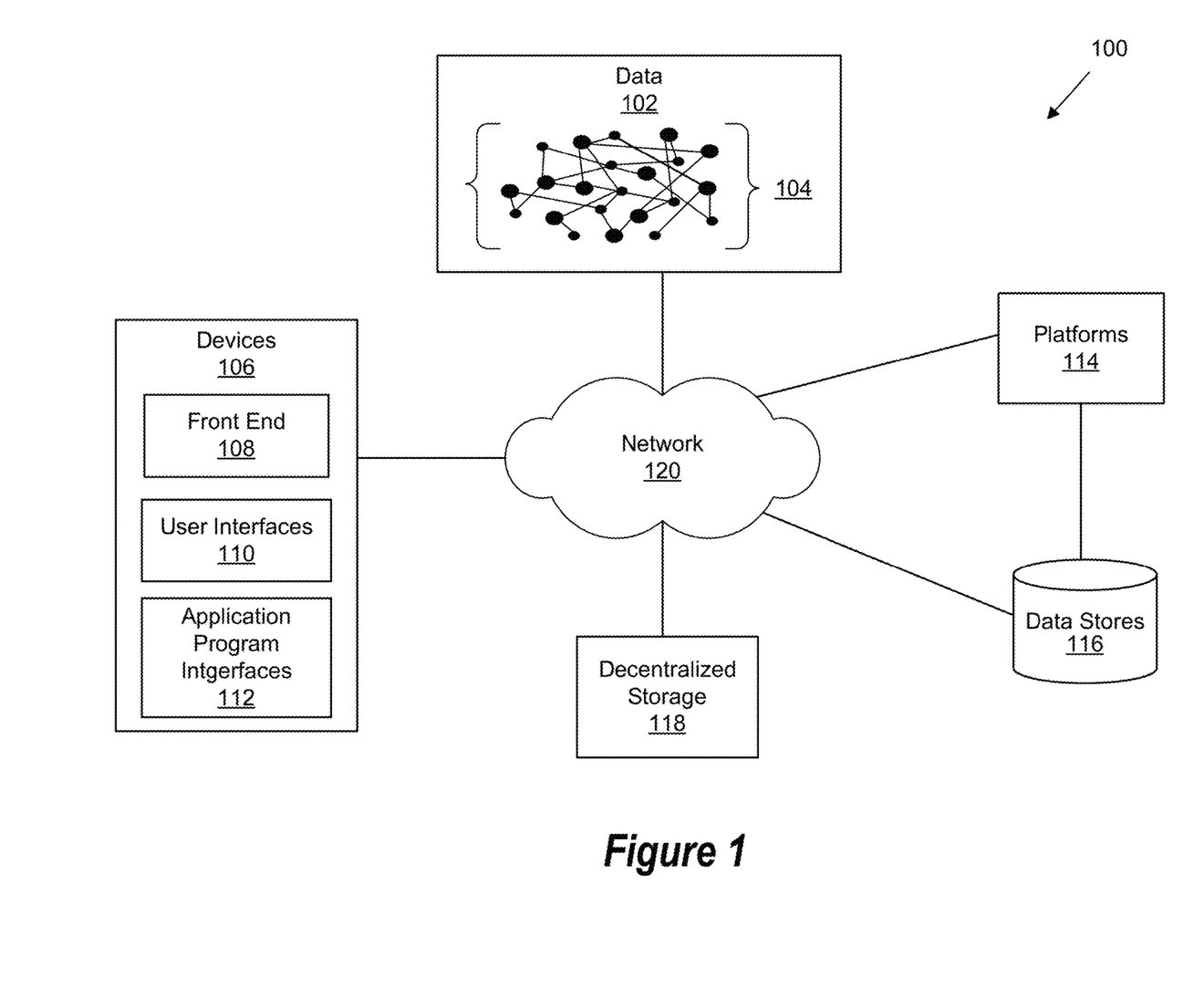
FIG. 1 is a general illustration of a system for personal data management of the present invention.

FIG. 1 shows a system 100 for personal data management of the present invention. Data 102 is available at various locations in the world wide web (WWW), as represented by 104 that includes nodes (i.e., locations) and edges/connections with the nodes). The nodes/locations of the data 102 exists in physical, cloud based, virtual, etc. storage. Users and entities have personal data that is located or stored at such nodes/locations. The data 102 is accessed by and controlled by users as further described herein.

In various implementations, through devices 106, users or entities access their personal data from data 102. Implementations provide for the data 102 to be processed and provided to devices 106 as further described herein. Device(s) 106 include a front end 108, interfaces 110, and application program interfaces (APIs) 112 to communicate with other devices and elements in system 100.

Implementations provide for the system 100 to include multiple information and data hosting platforms 114. In particular, devices 106 and their front end 108 are configured to communicate and connect with platforms 114. The platforms 114 are configured to gather and process personal data from data 102 for users and entities. Platforms 114 are considered as backends for personal data from data 102 to be processed. Such personal data are hosted on the platforms 114 and can include various and different types of data. The platforms 114 are embodied in different configurations, including physical servers, cloud computing, virtual computing, containerized computing, etc.

Implementations provide for the multiple platforms 114 to be associated with data stores 116. For example, data hosted on a platform 114 is associated with a data store 116. The data stores 116 are located with or separate from platforms 114. Furthermore, different configurations exist for data stores 116, such physical, cloud based, etc. configurations. As further described herein, platforms 114 and data stores 116 that are "hosted" by a particular user or entity as to the personal data of the user or entity, are clustered together to allow for backup of data and information, and to recover data and information.

Implementations further provide for the system to include decentralized storage 118. The decentralized storage 118 includes decentralized ledger, such as a blockchain based digital storage system used for data storage and retrieval. Implementations provide for personal data of users to be stored to decentralized storage 118 to further allow for backup and recovery. An example of such a blockchain based digital storage system is Filecoin, which is an open source, public cryptocurrency.

Connectivity in system 100 is represented by network 120. The network 120 may be a public network, such as the Internet, a physical private network, a wireless network, a virtual private network (VPN), or any combination thereof.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 2:
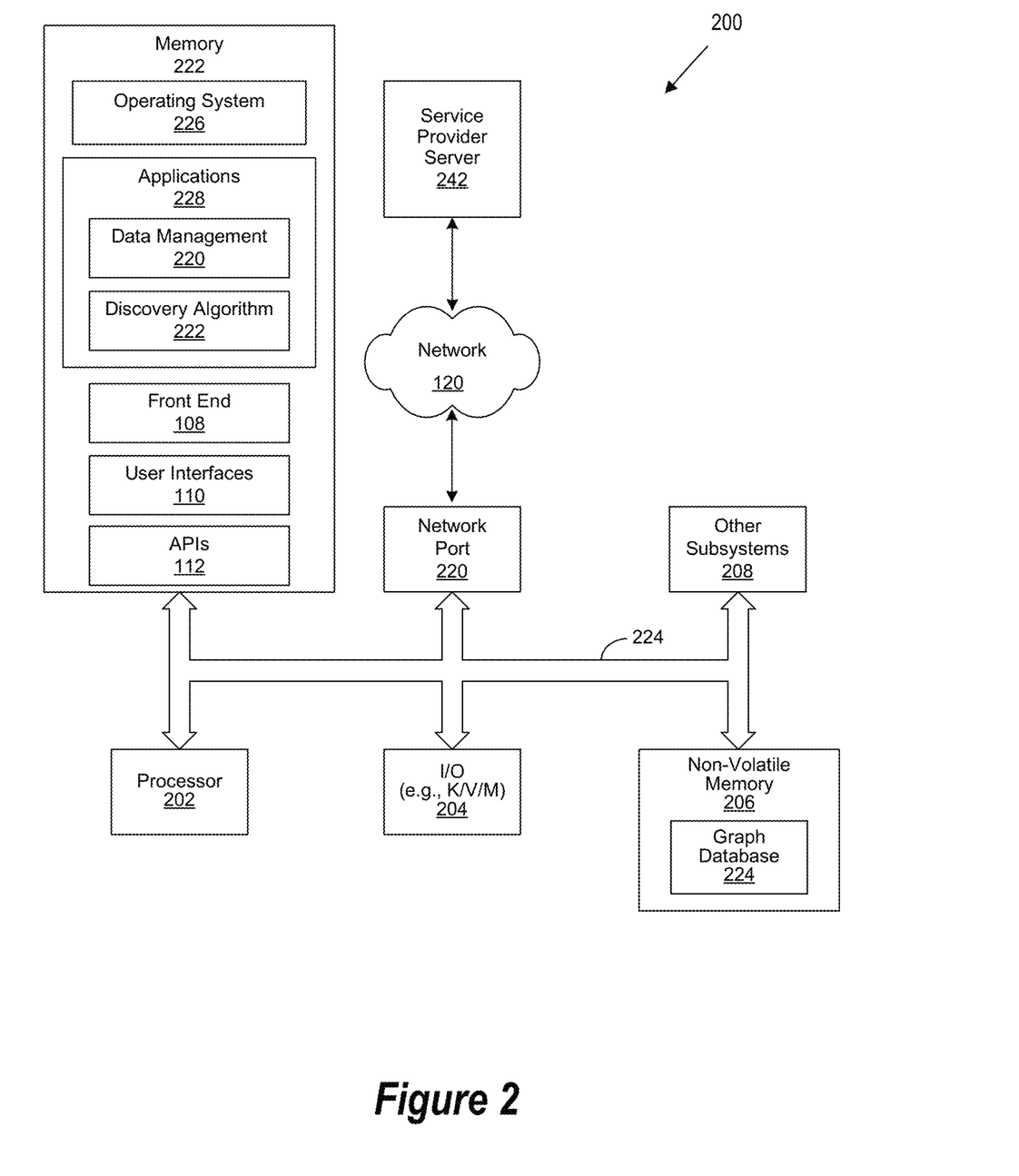
FIG. 2 is a general illustration information handling system as implemented in the system and method of the present invention.

FIG. 2 is a generalized illustration of a user information handling system 200 that can be used to implement the system and method of the present invention. The information handling system 200 includes a processor (e.g., central processor unit or "CPU") 202, input/output (I/O) devices 204, such as a keyboard, a video/display, a mouse, and associated controllers (e.g., K/V/M), a hard drive or disk storage non-volatile memory 206, and various other subsystems 208. In various embodiments, the information handling system 200 also includes network port 210 operable to connect to the network 120, which is likewise accessible by a service provider server 242. As discussed above, the network 120 may be a public network, such as the Internet, a physical private network, a wireless network, a virtual private network (VPN), or any combination thereof.

The information handling system 200 likewise includes system memory 212, which is interconnected to the foregoing via one or more buses 214. System memory 212 further comprises operating system (OS) 216 and in various embodiments may also include applications 218 that are configured to perform various operations and tasks on the information handling system 300.

In various implementations, applications 218 include data management software 220 and discovery algorithm 222. Data management software 220 is further described herein. An example of discovery algorithm 222 can be found in United States Patent US20170200236A1, which is incorporated by reference. Embodiments provide for the front end 108, user interfaces 110, and APIs 112 to be included in memory 222.

Various implementations provide for a non-volatile memory 206 to include a graph database 224 of a user's personal data. The user's personal data of graph database 124 can be received or downloaded from other sources, such as external storage, cloud base storage, etc. as further described herein.

The graph database 124 is defined as a database that implements graph structures that can provide for semantic queries, where the graph database 124 includes nodes, edges, and properties to represent and store data. Graph database 124 relates data items to a collection of nodes and edges, where edges represent relationships between the nodes. Such relationships can allow data in the graph database 124 to be linked together directly and can be retrieved with one operation. The graph database 124 holds relationships between data as a priority. Since relationships are stored in graph database 124, querying relationships can be relatively quick and efficient. Implementations provide for data, such as relationships are store graph database relational mapping which uses triplets to specify relations. A database is a "document store" database or an SQL database or other including graph. Data is stored in the database and also stored as binary in the filesystem, such as IPFS, in an acyclic graph format (.car files) which can be used by IPFS, IPFS Cluster, and Filecoin to replicate, fetch, and store only needed data when required.

Implementations provide for privacy setting embodiment configured to multiple databases for multiple permission levels of data stored in the databases. Decoupling of user access to specific data which may be more sensitive in nature. All data is accessible by a user and possibly by applications installed on the platform based on given permission, but there may be multiple databases within the data handling system where different data is stored. Graph mapping is utilized by the user to decrypt the locations of certain data in the data store.

Figure 3:
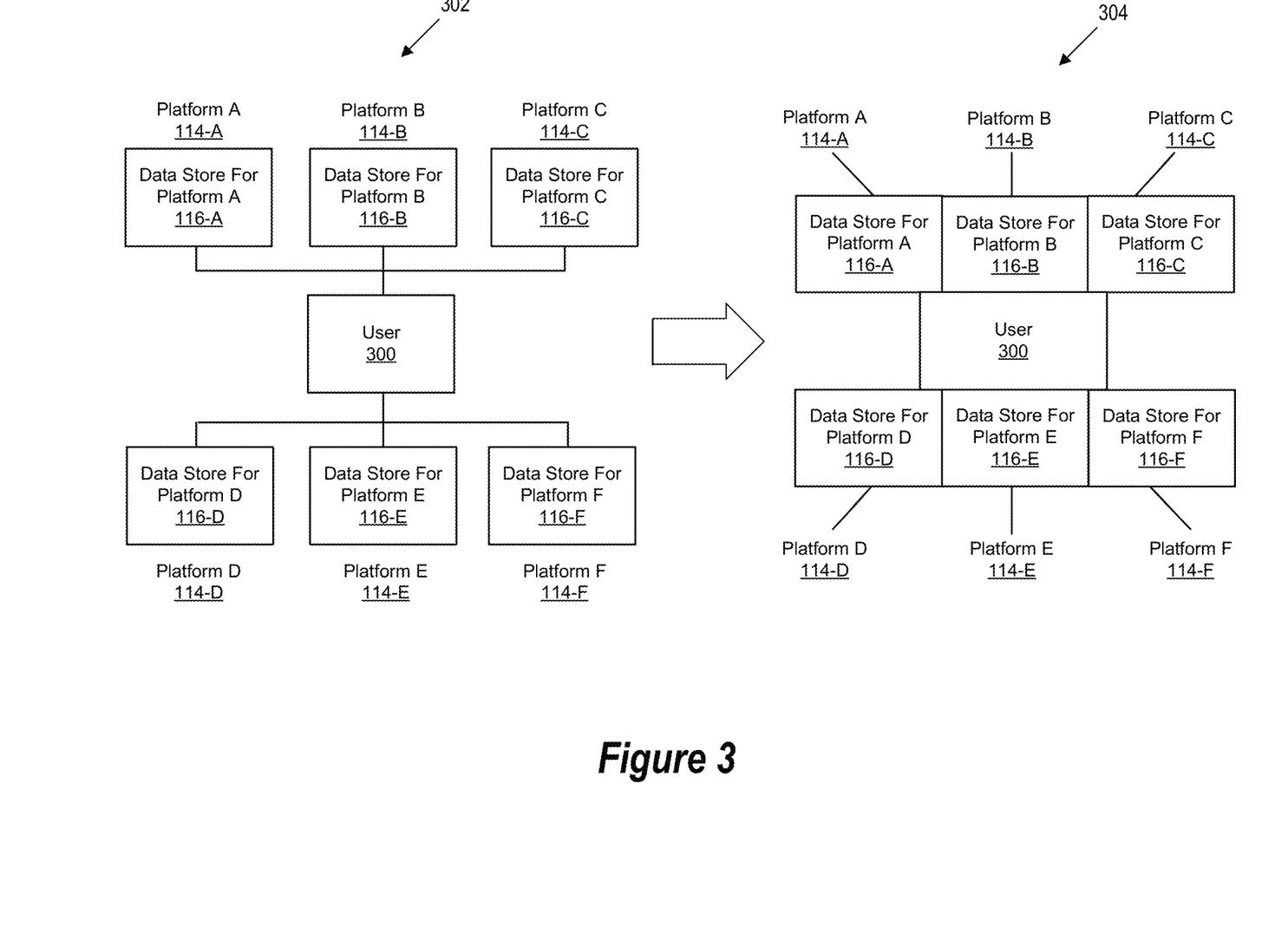
FIG. 3 is an illustration of relationship between a user, user platforms, and user data on user platforms of the present invention.

FIG. 3 shows the relationship between a user 300, particular platforms 114, and user data on platforms or data stores 116. The user 300 represents a device, such as device 106 as implemented as an information handling device 200 described above. A particular device accessed by a particular user or entity.

Implementations provide for multiple platforms 114-A, 114-B, 114-C, 114-D, 114-E, and 114-F to host various and different types of user information and data. In this example, platform 114-A supports/hosts data store A 116-A; platform 114-B supports/hosts data store B 116-B, platform 114-C supports/hosts data store C 116-C, platform 114-D supports/ hosts data store D 116-D, platform 114-E supports/hosts user data store E 116-E, and platform 114-F supports/hosts data store F116-F In an implementation 302, the data stores 116 are scattered over and hosted by the multiple platforms 114. The multiple platforms 114 are disconnected from and do not communicate with one another.

In contrast, in an implementation 304, user 300 is considered to host personal data of the user or entity. Such an implementation provides for the multiple platforms 114 to connect and communicate with one another. Furthermore, as backends, the platforms 114 are interoperable. Information and data, such as data graphs (e.g., graph database 124) are imported together from data 102, providing an efficient connection to user 300.

Such a decentralized implementation provides that personal information and data (e.g., files) of a user or entity will be available to the user or entity, since the user or entity owns the data, and not third parties, such as those which host platforms 114. With multiple platforms 114 for data storage, where the user or entity hosts the data, dependency on third parties that host platforms 114 is reduced.

In various implementations, there are platforms 114 that host redundant or same data. With such multiple platforms 114 for data storage, if one platform 114 fails, other platforms 114 can take up for the failed platform 114. In cases of lost data, the lost data is rebuilt from other cluster nodes or clustered platforms 114. For example, where data is stored as graph databases, the data can be restored from nodes of graph databases.

Figure 4:
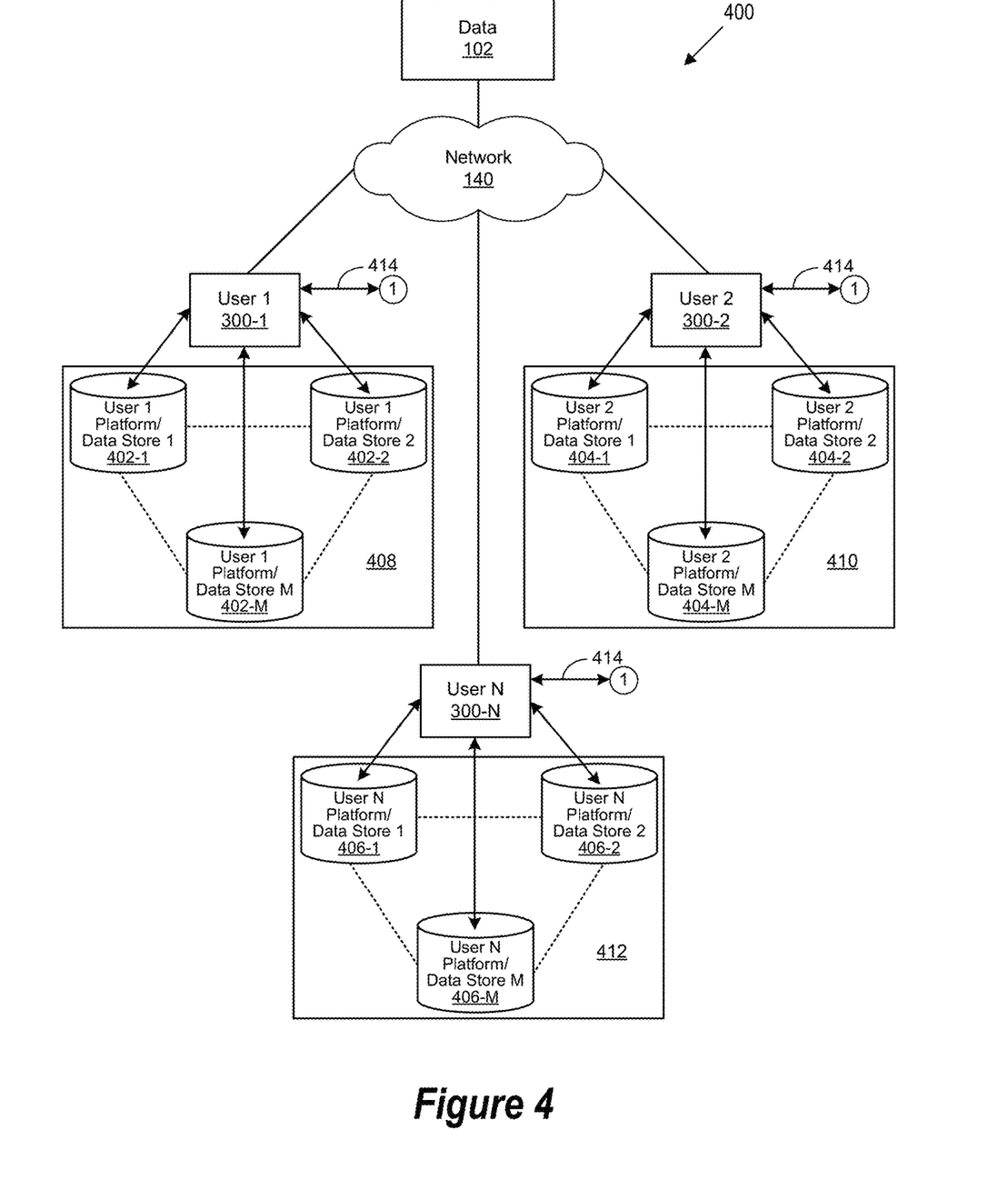
FIG. 4 is an illustration of a system that stores and shares user data of the present invention.

FIG. 4 shows a system 400 that stores and shares user data. Various and multiple users 300 are included in system 300. As discussed, users 300 are computing devices, such information handling system 100 as described above that are accessed by individuals and entities. As discussed, data 102 represents information or data of individuals and entities that are located or found at various sites and locations, which can be physical, virtual, cloud based, etc. that are found on the world wide web.

The users 300 are connected to data 102 through network 140. As discussed above, the network 140 may be a public network, such as the Internet, a physical private network, a wireless network, a virtual private network (VPN), or any combination thereof.

As discussed, user 300 hosts their data, which can be encrypted and accessed through different platforms 114. In various implementations, data is stored in particular data stores 116 accessed or hosted by particular platforms 114. In the system 400, such a platform 114 and data store 116 combination are represented as user platform/data store 402.

The system 300 includes multiple users 300-1 to 300-N. In this example the user 300-1 accesses multiple user 1 platform/data store 402-1 to user 1 platform/data store 402-M. Likewise, user 300-2 accesses multiple user 2 platform/data store 404-1 to user 2 platform/data store 404-M. User 300-N accesses multiple user N platform/data store 406-1 to user platform/data store 406-M.

Various implementations provide for clustering of user platform/data store 402 that are particular to a user 300. As discussed, the user 300 is considered to host information and data that is particular to a person, entity or user. Also, as discussed clustering of the user platforms/data stores 402 provides that in the event a user platform/data store 402 goes down/fails, software and data are still available or recoverable for the user 300.

In this example, multiple user 1 platform/data store 402-1 to user 1 platform/data store 402-M are clustered as 408 to support user 1 300-1. Multiple user 2 platform/data store 404-1 to user 2 platform/data store 404-M are clustered to support user 2 300-2. User N platform/data store 406-1 to user platform/data store 406-M are clustered to support user M 300-M.

In certain implementations, the clusters 408, 410, 412 run a single implementation of the data management software 220 and discovery algorithm 222 as described in FIG. 2. Implementations also provide for a single implementation of a graph database. Data management software 220 provides for linking to other users 300 and discover algorithm 222 provides for identifying is further described herein. An example of discovery algorithm 222 is used to distribute data based on permission levels and discover the other users 300. In the example of FIG. 4, a connection 414 is provided between the users 300-1 to 300-M. In certain implementations, data shared between clusters (e.g., clusters 408, 410, 412) is also clustered, such as a one-to-one or one-to-many configuration.

As discussed, a single-user cluster assures that in the event, software and databases go down/fail, the software and databases are available to users 300. Therefore, if a platform/data store 404 (e.g., server computer) goes down/fails, the other clustered platform/data store 404 take up for the failed platform/data store 404. Also as discussed, a decentralized storage 118 is provided in various implementations, for data backup. In various implementations for example, when a server/server cluster goes down, an action is performed by a bootstrap cluster as described in FIG. 6 herein, to bring up other server/server clusters from the same or different hosting provider, which can rejoin the other clusters and synchronize existing data Furthermore, implementations provide in the event that an entire cluster goes down, the use of decentralized storage is used, and the bootstrap cluster can bring up multiple server/server clusters and retrieve data from the decentralized storage to reinitialize the cluster. The actions can take place automatically and configured by a user through an interface to the system and can be termed as distributed secure cluster orchestration (DSCO).

Figure 5:
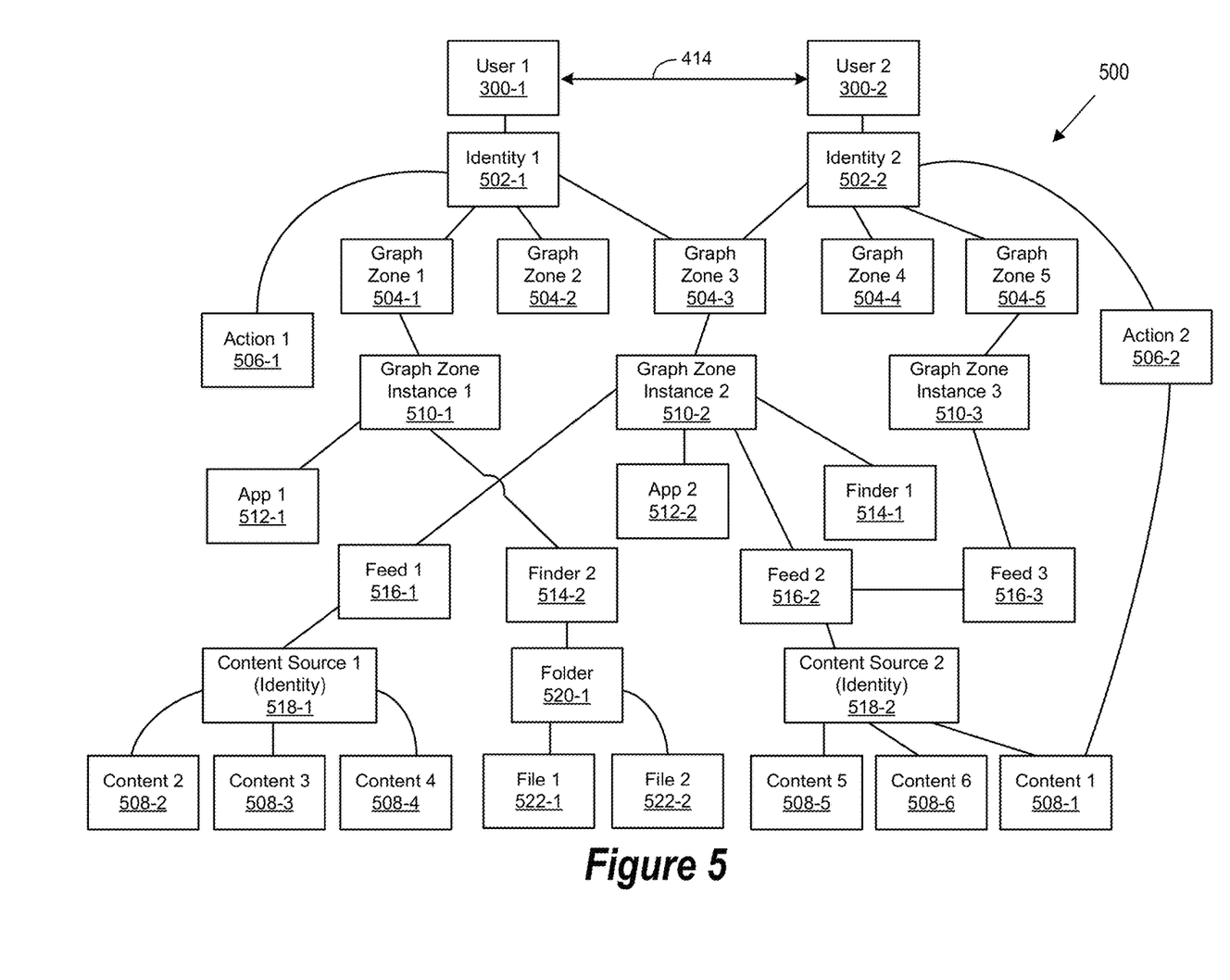
FIG. 5 is an illustration of a structure that relates users with data of the present invention.

FIG. 5 shows a structure that relates users with data. Data of users 300 can be represented in various structures and formats, such as graph databases as discussed above. The structure 500 shows data elements associated with users 300. In this example, user 1 300-1 is connected to user 2 300-2. User 1 300-1 is assigned an identity 502-1 and user 2 300-2.

The identities 502 relate to graph zones 504 or to an action 506. Implementations provide for actions 506 to be shared by identities 502 (e.g., graph zone 3 504-4 shared by identity 1 502-1 and identity 2 502-2). Graphs zones 504 are considered as high level categories to organize data. An action 2 is associated with a content 508, such as action 2 506-2 to content 1 508-1.

The graph zones 504 are associated with graph zone instances 510. A graph zone instance 510 is associated with an application 512, a finder 514, or feed 516. Feeds 516 are associated with a content source (identity) 518. The content sources (identities) 518 are associated with contents 508. Finders 514 are associated with folders 520. Folders 520 are associated with files 522.

Figure 6:
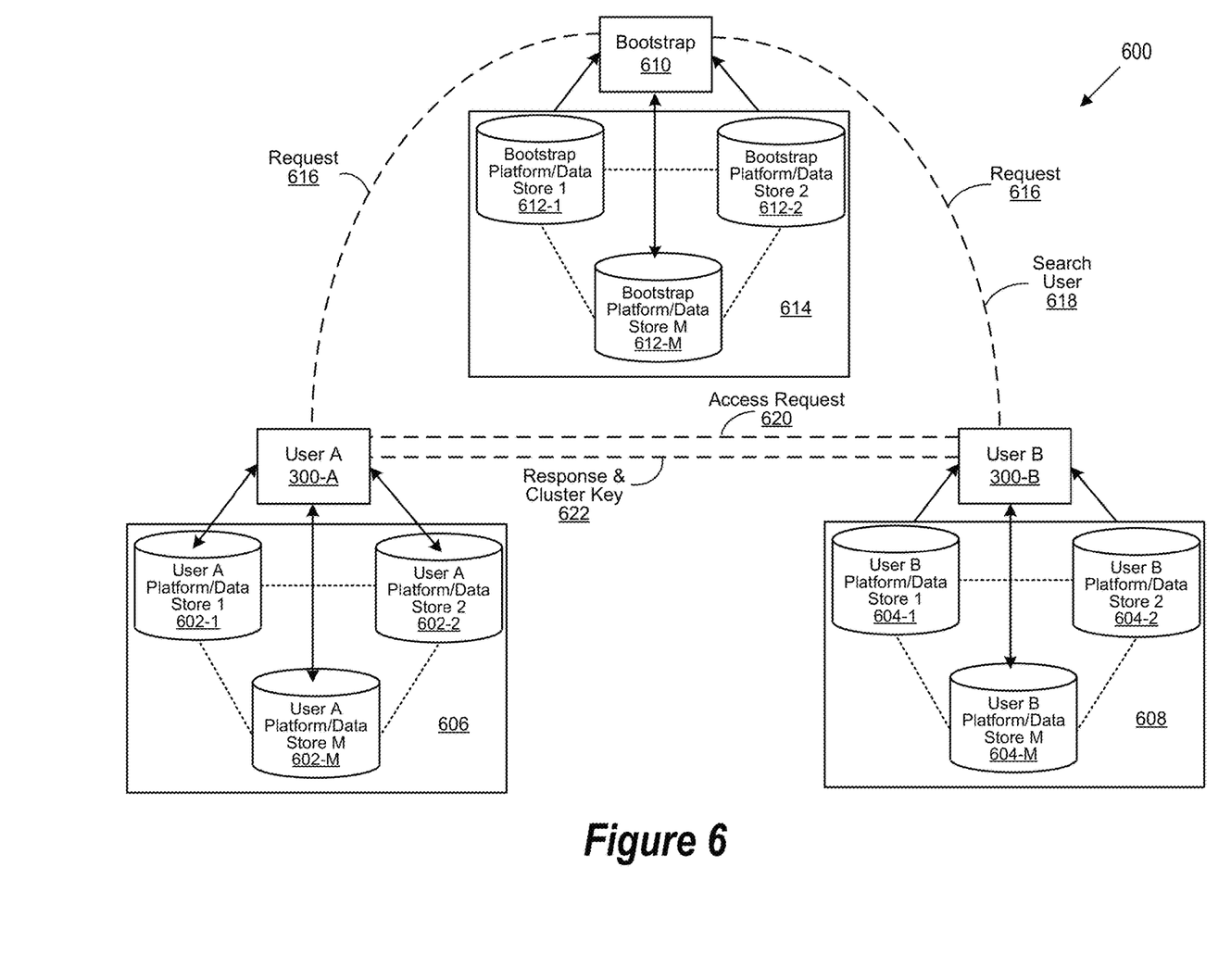
FIG. 6 is an illustration of a system to bootstrap user platforms and data stores of the present invention.

FIG. 6 shows a system 600 to bootstrap user platforms and data stores. In particular, cluster connections are performed between users 300. In this example, user A 300-A accesses multiple user A platform/data store 602-1 to user A platform/data store 602-M. Likewise, user 300-B accesses multiple user B platform/data store 604-1 to user B platform/data store 604-M. The multiple user A platform/data store 602-1 to user A platform/data store 602-M are clustered as 606 to support user A 300-A. The multiple user B platform/data store 604-1 to user B platform/data store 604-M are clustered as 608 to support user B 300-B.

In various implementations, a user 300 provides bootstrapping operations to the other users 300 to allow for data and cluster connections between the users. In this example, such connections are performed by a user 300 identified as bootstrap user or bootstrap 610. The bootstrap 610 accesses multiple bootstrap platform/data store 612-1 to bootstrap platform/data store 612-M. The multiple bootstrap platform/data store 612-1 to bootstrap platform/data store 612-M are clustered as 614 to support bootstrap 610.

In a bootstrap operation which in certain implementations is performed by data management software 220 and discover algorithm 222, user A 300-A and user B 300-B provide a request 616 to bootstrap 610. The bootstrap 610 performs a search 618 as to user A 300-A and user B 300-B which can include identifying or receiving IDs of user A 300-A and user B 300-B. Access request 620 is performed between user A 300-A, user B300-B, and bootstrap 610. Response and cluster keys 620 are exchanged between user A 300-A and user B300-B directly. Once cluster keys are exchanged, certain data stored in user A 300-A and User A Platform/Data Store as in 602-1, may be automatically synced to the user B 300-B and to User B Platform/Data Stores as in 604-1 via a Peer 2 Peer cluster connection. Such data syncing is subject to permission privilege levels placed by user A 300-A. The data, once synced to User B Platform/Data Store 604-1, will then in kind be replicated to User B Platform/Data Stores 604-2 to 604-M via clustered connection. Such data can then reliably be used by User B 300-B to search and implement discovery processes on.

Figure 7:
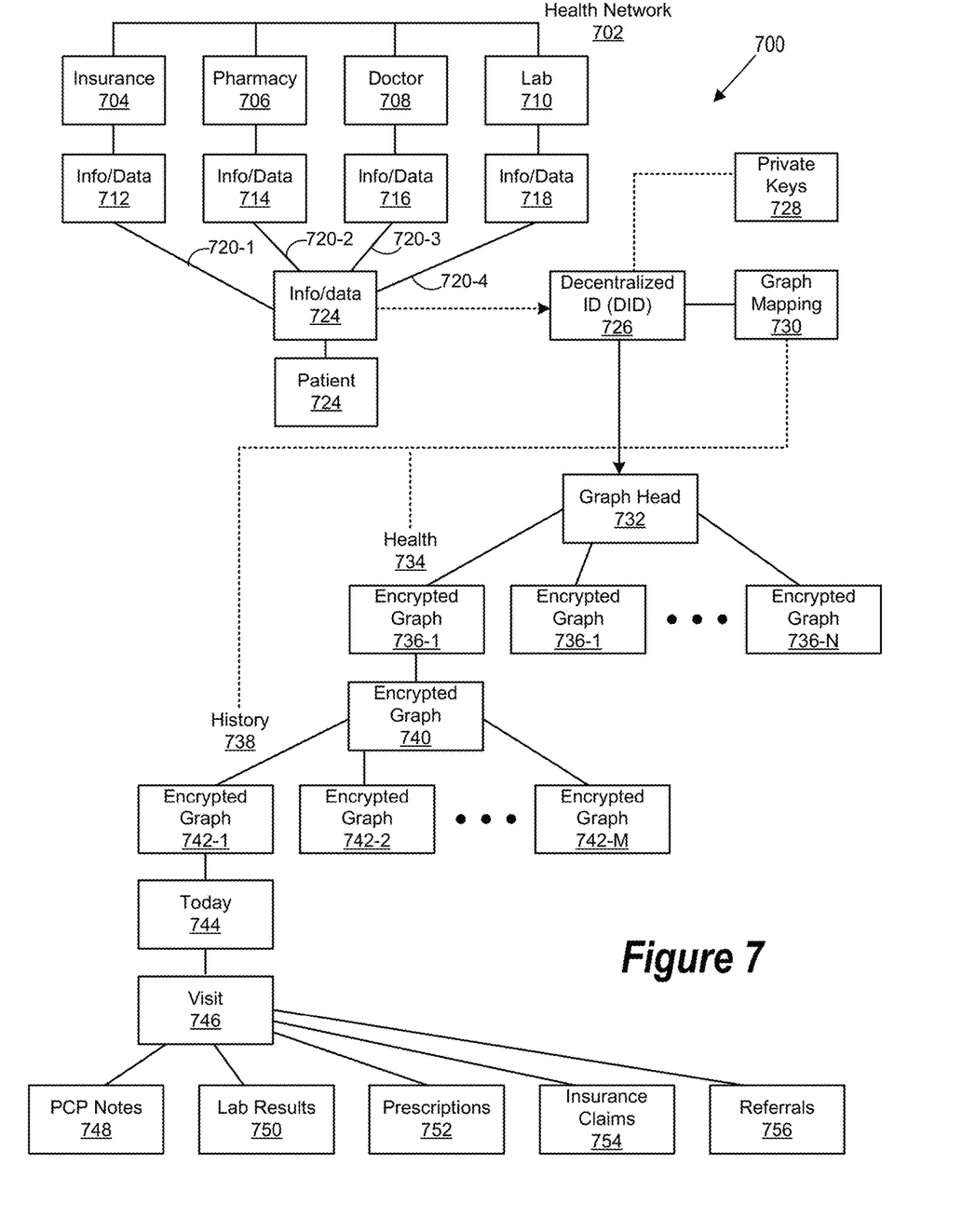
FIG. 7 is an illustration of a graph instance mapping of the present invention.

FIG. 7 shows a graph instance mapping 300. In this example, a personal graph such as a graph database is created for a particular medical patient based on mapping of information from other health care related entities to the patient. In particular, the mapping is performed using the interaction of information and data of clustered platforms/data stores of users described herein. Users being the health care related entities.

The graph that is mapped is considered a personal graph to the patient. Other applications and uses are contemplated, including social media use where only certain users are desired to share their information and data with a user. Banking and finance, where personal financial records of a user a desired to be provided. Implementations provide for a trusted network to be used to connect users.

In the graph instance mapping 700, a health network 702 includes health care related entities of a medical insurance 704, a pharmacy 706, a doctor 708, and a laboratory 710. Information and data of the health care related entities are represented respectively by info/data 712, info/data 714, info/data 716, and info/data 716, which are in various implementations, clustered or non-clustered platforms/data stores (e.g., platforms 114 and data stores 116) of the users or health care related entities.

In certain implementations, a trusted network is implemented as represented by trusted connection(s) 720-1, 720-2, 720-3, and 720-4. The trusted network is to a patient 722. Information and data are shared over the trusted network (i.e., trusted connections 720) with a patient 722, to create information and data related to the patient represented as info/data 724. Various implementations provide for further validation of credentials related to the health care related entities.

Implementations provide for patient info/data 724 to include a decentralized identifier or DID 726. Private keys 728 in various implementations are included in/associated with DID 726. The private keys 728 are used in encryption/decryption of personal data graphs of the patient 722. Implementations provide for private keys 728 private keys to be stored on a physical hardware private key storage device that is disconnected from the Internet by default and may include satellite, cellular, Bluetooth or other communication methods to provide platforms with keys needed to decrypt user data in the data stores.

Graph mapping 730 is performed on the info/data 724. The DID 726 is associated with graph head 732, where personal data graphs are generated. A top level health graph 734 is generated, which includes encrypted graphs 736-1 to 736-N. In this example, a more specific history graph 738 is generated. Encrypted graph 740 represents the history graph 738, where encrypted graph 740 is generated from encrypted graph 736-1. Encrypted graphs 742-1 to 742-M are generated from encrypted graph 740.

From the encrypted graph 742-1, a specific history graph is generated related to present history represented by today 744. From the graph today 744, a visit graph 746. From visit graph 746, more specific graphs are generated represented by principal care physician (PCP) notes 748, lab results 750, prescriptions 752, insurance claims 754, and referrals 756.

Figure 8A:
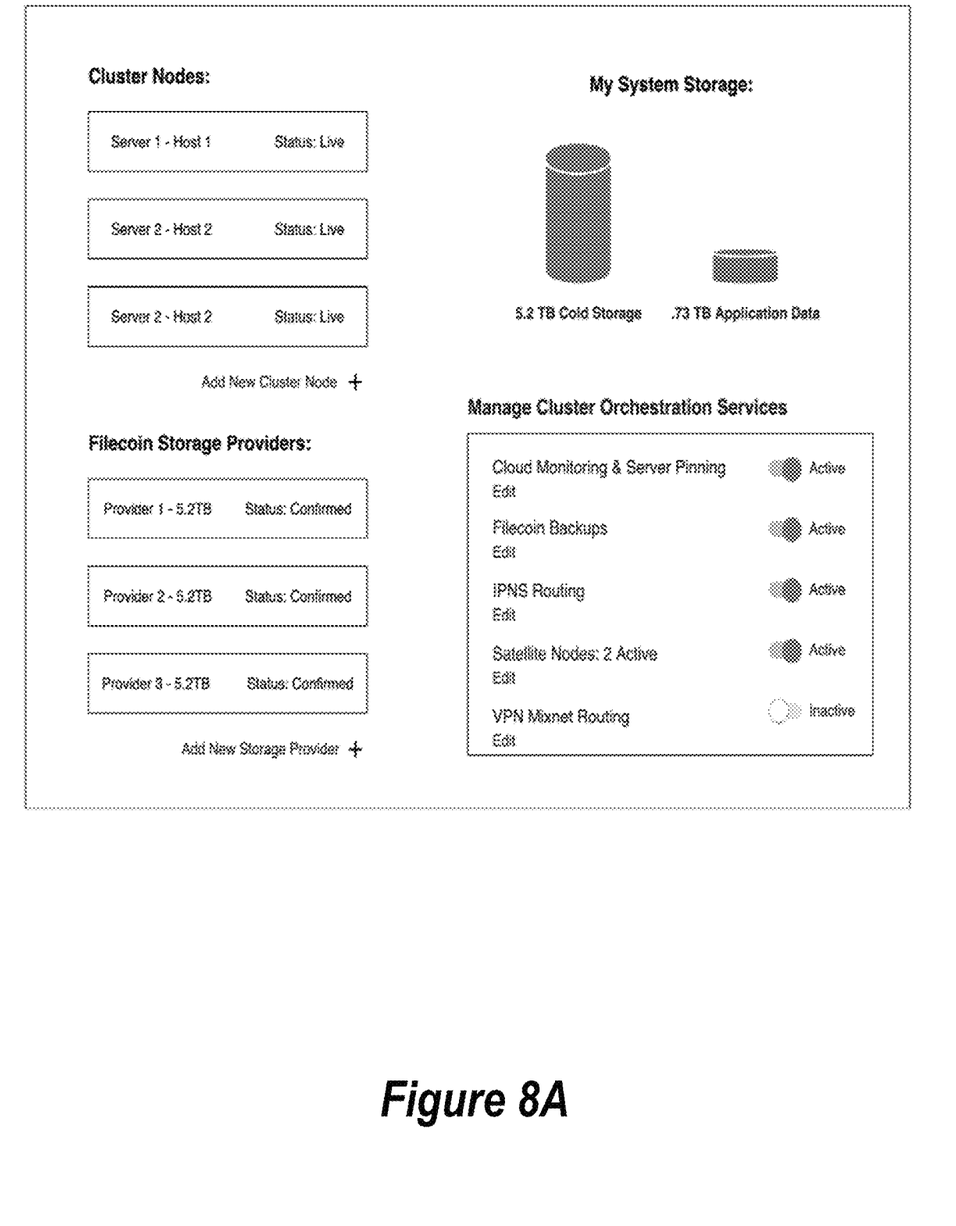
FIG. 8A is an illustration of a graphical user interface for distributed secure cluster orchestration customizer.

FIG. 8A shows a graphical user interface (GUI) for distributed secure cluster orchestration customizer. Implementations provide for the GUI to be included in user interfaces 110 as described in FIGS. 1 and 2. The GUI 8A entails setting minimum number of platforms/devices/datastores in the user's main cluster that must be running at any given time, setting preferred service providers such as private cloud hosting providers or Filecoin storage providers and geography of such providers including ability to compare various providers. Further implications provide for selecting and configuring other cloud based services which may add functionality such as increased security, uptime, data backups or increase usefulness of the data stored such as personal AI analysis of all user data, and setting where certain data may reside in the cluster, based on data type or permission level. The GUI 8A will also allow for user to set payment information for provided services including setting which payment methods they'd like to use which may be fiat or cryptocurrency based on availability.

Figure 8B:
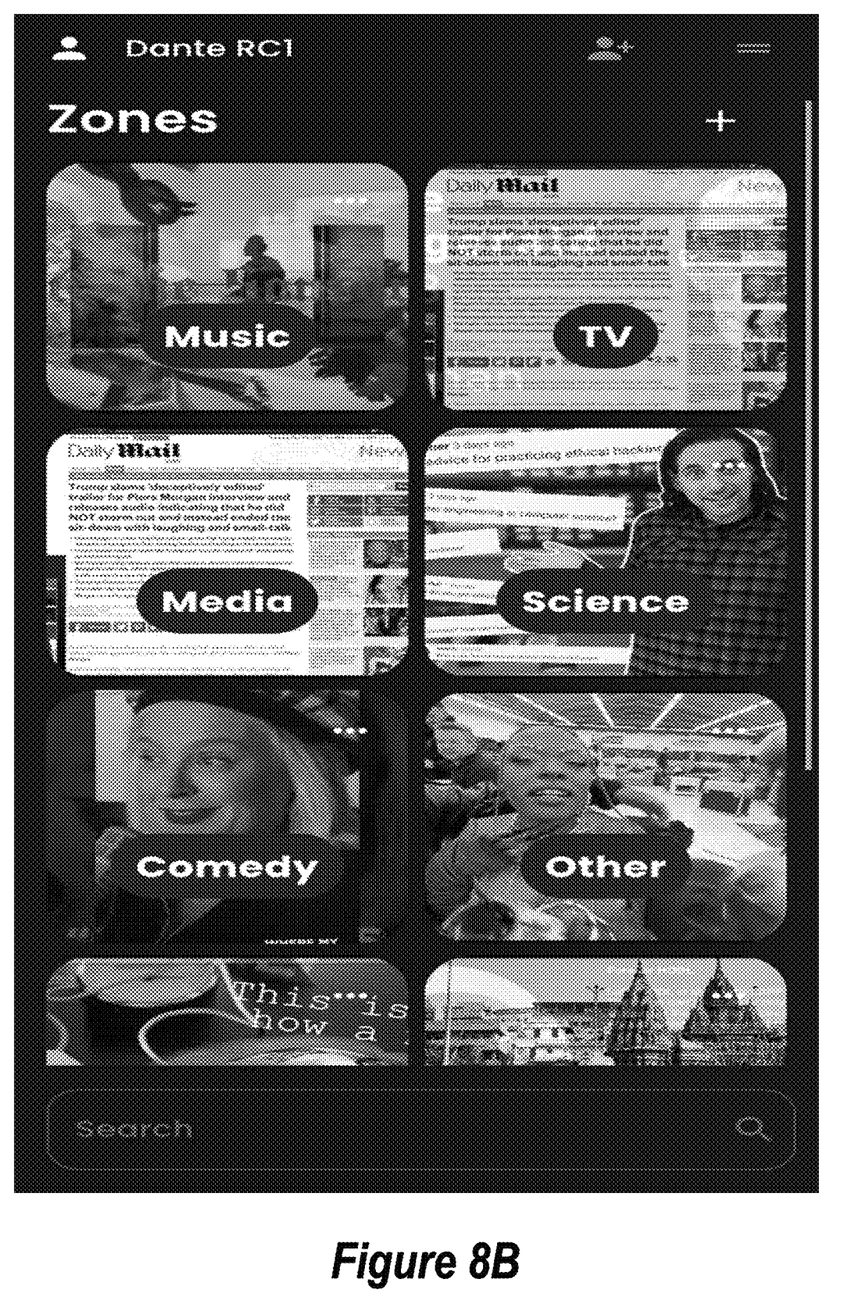
FIG. 8B is an illustration of a graphical user interface for graph zone data categories.

FIG. 8B shows graphical user interface (GUI) for graph zone data categories. Implementations provide for the GUI to be included in user interfaces 110 as described in FIGS. 1 and 2.

Figure 8C:
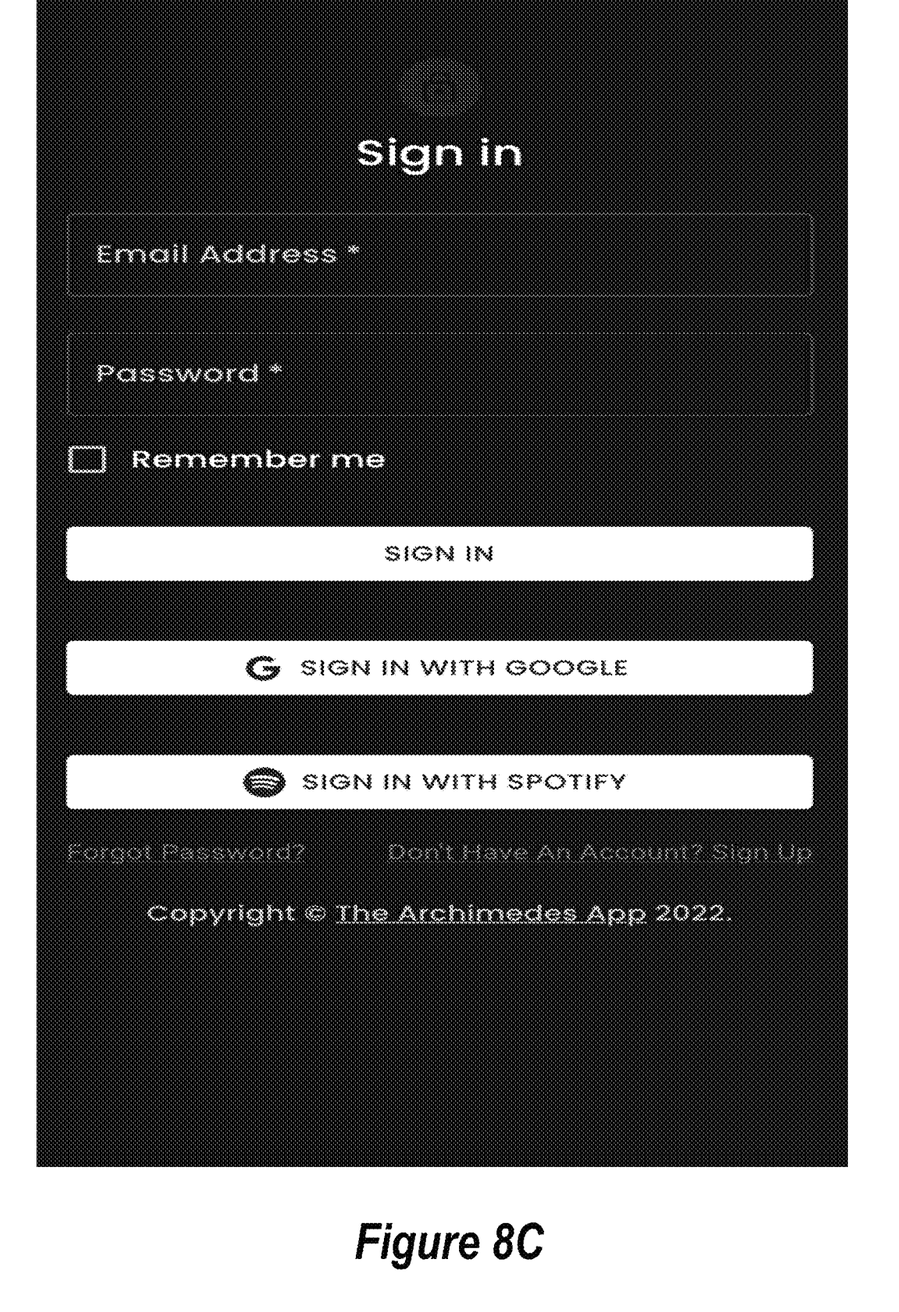
FIG. 8C is an illustration of a graphical user interface for multi-platform login.

FIG. 8C shows a graphical user interface (GUI) for multi-platform login. Implementations provide for the GUI to be included in user interfaces 110 as described in FIGS. 1 and 2. The GUI 8C is implemented as login users for data management.

Figure 9:
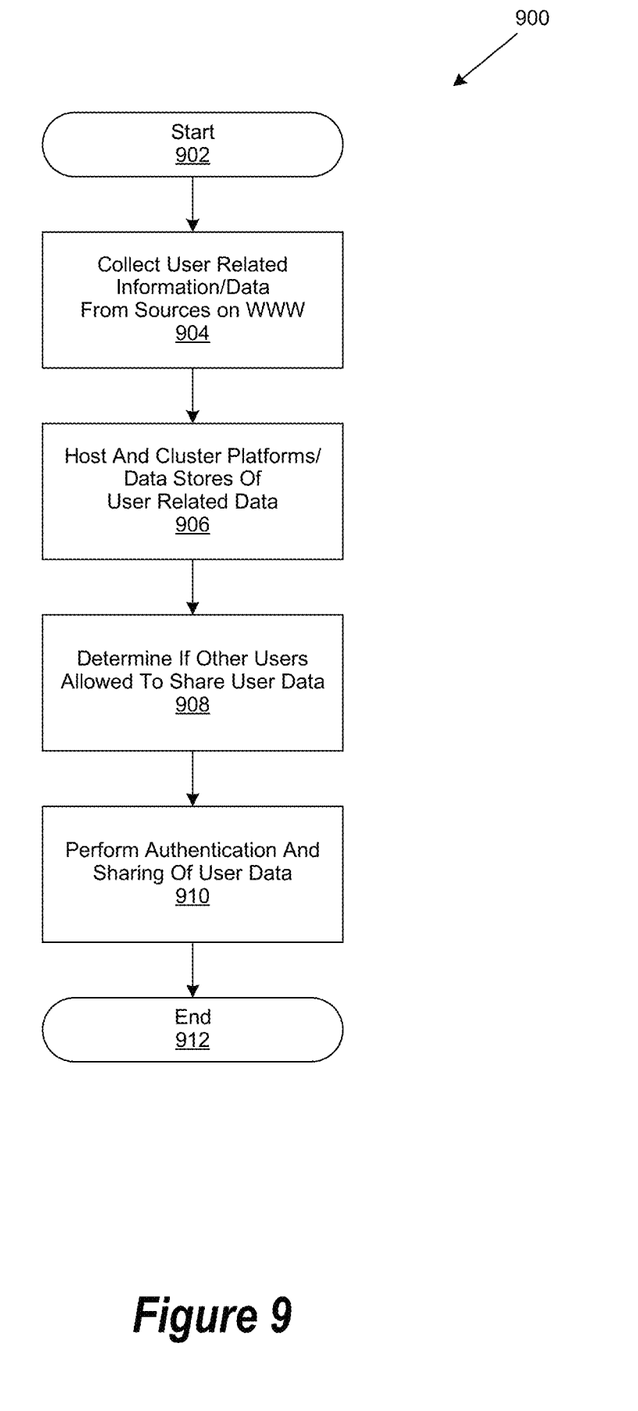
FIG. 9 is a generalized flowchart for hosting personal data over multiple platforms/data stores which are clustered and shared with users.

FIG. 9 is a generalized flowchart 900 for hosting personal data over multiple platforms/data stores which are clustered and shared with users. In various embodiments, the system 100 and information handling system 200 are implemented. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 902, process 900 starts. At step 904, information and data related to user is collected. The data 102 as described in FIG. 1 is gathered and hosted on various platforms and data stores, such as platforms 114 and data stores 116. Implementations provide for information and data to be stored as graph databases.

At step 906, a user or particularly a device that is accessed by an entity or user, such as devices 106 hosts the platforms and data stores that host and store user data. Clustering of the platforms and data stores is performed to allow for backup and retrieval of the information and data.

At step 908, determining is performed if the user data is to be shared with other users. In certain instances, the user desires to receive other user information and data. Implementations provide for the bootstrap operation described in FIG. 6 to be used.

At step 910, authentication and sharing are performed. Authentication can include the use of device identifiers, such as decentralized IDs 726 described in FIG. 7. Private keys 728 can be implemented to encrypt information and data. Implementations provide for the use of a trusted network and trusted connections, such as trusted connection(s) 720-1, 720-2, 720-3, and 720-4. Continuous access to personal data is allowed if determined to be shared with others. Syncing personal data is performed when changes are made to the personal data. At step 912, the process 900 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for personal data management comprising:

hosting information and data as user personal data stored as graph databases, that resides on multiple platforms and data stores accessed by applications, wherein graph databases include nodes and edges to store data, edges representing relationships to nodes, wherein the graph databases implement relationship mapping and hold relationships to data as a priority;

clustering the multiple platforms and data stores, wherein each of the multiple platforms and data stores are accessible to one another through the graph databases, wherein the clustering includes a peer-to-peer cluster connection that provides user data syncing between the multiple platforms specific to a permission level of each user;

determining if the user personal data is to be shared with other users from the clustered multiple platforms and data stores by querying relationships of the graph databases and determining, from the relationship mapping, whether sharing of the user personal data is subject to the permission level placed by a user with respect to the other users;

allowing continuous access to the user personal data if determined to be shared with the other users by the determining through the graph databases; and syncing in real time the user personal data when changes are made.

2. The method of claim 1, wherein the personal data is gathered from various locations on the world wide web.

3. The method of claim 1, wherein the determining if the personal data is to be shared with other users from the clustered multiple platforms and data stores is performed by a boot strapping process by a user.

4. The method of claim 1, wherein the allowing the access is through a trusted network.

5. The method of claim 1 further comprising performing a graph mapping of information and data shared between users.

6. The method of claim 1 further comprising storing personal data in a decentralized storage.

7. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions for personal data management executable by the processor and configured for:

hosting information and data as user personal data stored as graph databases, that resides on multiple platforms and data stores accessed by applications, wherein graph databases include nodes and edges to store data, edges representing relationships to nodes, wherein the graph databases implement relationship mapping and hold relationships to data as a priority;

clustering the multiple platforms and data stores, wherein each of the multiple platforms and data stores are accessible to one another through the graph databases, wherein the clustering includes a peer-to-peer cluster connection that provides user data syncing between the multiple platforms specific to a permission level of each user;

determining if the user personal data is to be shared with other users from the clustered multiple platforms and data stores by querying relationships of the graph databases and determining, from the relationship mapping, whether sharing of the user personal data is subject to the permission level placed by a user with respect to the other users;

allowing continuous access to the user personal data if determined to be shared with the other users by the determining through the graph databases; and syncing in real time the user personal data when changes are made.

8. The system of claim 7, wherein the personal data is gathered from various locations on the world wide web.

9. The system of claim 7, wherein the if the personal data is to be shared with other users from the clustered multiple platforms and data stores is performed by a boot strapping process by a user.

10. The system of claim 7, wherein the allowing the access is through a trusted network.

11. The system of claim 7 further comprising performing a graph mapping of information and data shared between users.

12. The system of claim 7 further comprising utilizing secure cluster orchestration for detecting when platforms go offline and maintaining a minimum number of platforms with full data replication.

13. A non-transitory, computer-readable storage medium embodying computer program code, the computer program code comprising computer executable instructions configured for:

hosting information and data as user personal data stored as graph databases, that resides on multiple platforms and data stores accessed by applications, wherein graph databases include nodes and edges to store data, edges representing relationships to nodes, wherein the graph databases implement relationship mapping and hold relationships to data as a priority;

clustering the multiple platforms and data stores, wherein each of the multiple platforms and data stores are accessible to one another through the graph databases, wherein the clustering includes a peer-to-peer cluster connection that provides user data syncing between the multiple platforms specific to a permission level of each user;

determining if the user personal data is to be shared with other users from the clustered multiple platforms and data stores by querying relationships of the graph databases and determining, from the relationship mapping, whether sharing of the user personal data is subject to the permission level placed by a user with respect to the other users;

allowing continuous access to the user personal data if determined to be shared with the other users by the determining through the graph databases; and syncing in real time the user personal data when changes are made.

14. The non-transitory, computer-readable storage medium of claim 13, wherein the personal data is gathered from various locations on the world wide web.

15. The non-transitory, computer-readable storage medium of claim 13, wherein the allowing the access is through a trusted network.

16. The non-transitory, computer-readable storage medium of claim 13 further comprising performing a graph mapping of information and data shared between users.

17. The non-transitory, computer-readable storage medium of claim 13 further comprising storing personal data in a decentralized storage.

\* \* \* \* \*